United States Patent [19]

Kamiya et al.

[11] 4,218,134
[45] Aug. 19, 1980

[54] OPTICAL SYSTEM FOR COPIER

[75] Inventors: Osamu Kamiya; Nobuyuki Sekimura, both of Yokohama, Japan

[73] Assignee: Canon Kabushiki Kaisha, Tokyo, Japan

[21] Appl. No.: 964,986

[22] Filed: Nov. 30, 1978

[30] Foreign Application Priority Data

Dec. 19, 1977 [JP] Japan ................................ 148518/77

[51] Int. Cl.² ........................ G03B 27/76; G03B 15/00
[52] U.S. Cl. ........................................ 355/71; 355/11
[58] Field of Search ................. 355/67, 70, 71, 4, 3 R, 355/47-51, 8, 11, 14; 350/188

[56] References Cited

U.S. PATENT DOCUMENTS

| | | | |
|---|---|---|---|
| 3,143,921 | 8/1964 | Russell | 355/71 X |
| 3,594,160 | 7/1971 | Gunto et al. | 355/67 X |
| 3,785,812 | 1/1974 | Matsumoto | 355/4 X |
| 3,841,752 | 10/1974 | Terajima et al. | 355/70 X |
| 3,869,205 | 3/1975 | Gallo | 355/67 |
| 4,132,477 | 1/1979 | Watabe et al. | 355/11 |

FOREIGN PATENT DOCUMENTS

| | | | |
|---|---|---|---|
| 2350281 | 4/1975 | Fed. Rep. of Germany | 355/71 |
| 60142 | 5/1977 | Japan | 355/71 |

OTHER PUBLICATIONS

I.B.M. Technical Disclosure Bulletin, vol. 15, No. 2, Jul. 1972, p. 522.

Primary Examiner—Donald A. Griffin
Attorney, Agent, or Firm—Fitzpatrick, Cella, Harper & Scinto

[57] ABSTRACT

In a copier utilizing a halogen lamp as a light source and a CdS element as a photosensitive member and comprising a reflective lens system, a mirror contained in the reflective projection lens system is provided with a multi-layered coating of 5 to 9 layers of a dielectric substance to reduce exposure in the red wavelength range without reducing exposure in the blue and green wavelength ranges thereby matching the spectral characteristics of the light from an original with the spectral sensitivity of the photosensitive member.

12 Claims, 3 Drawing Figures

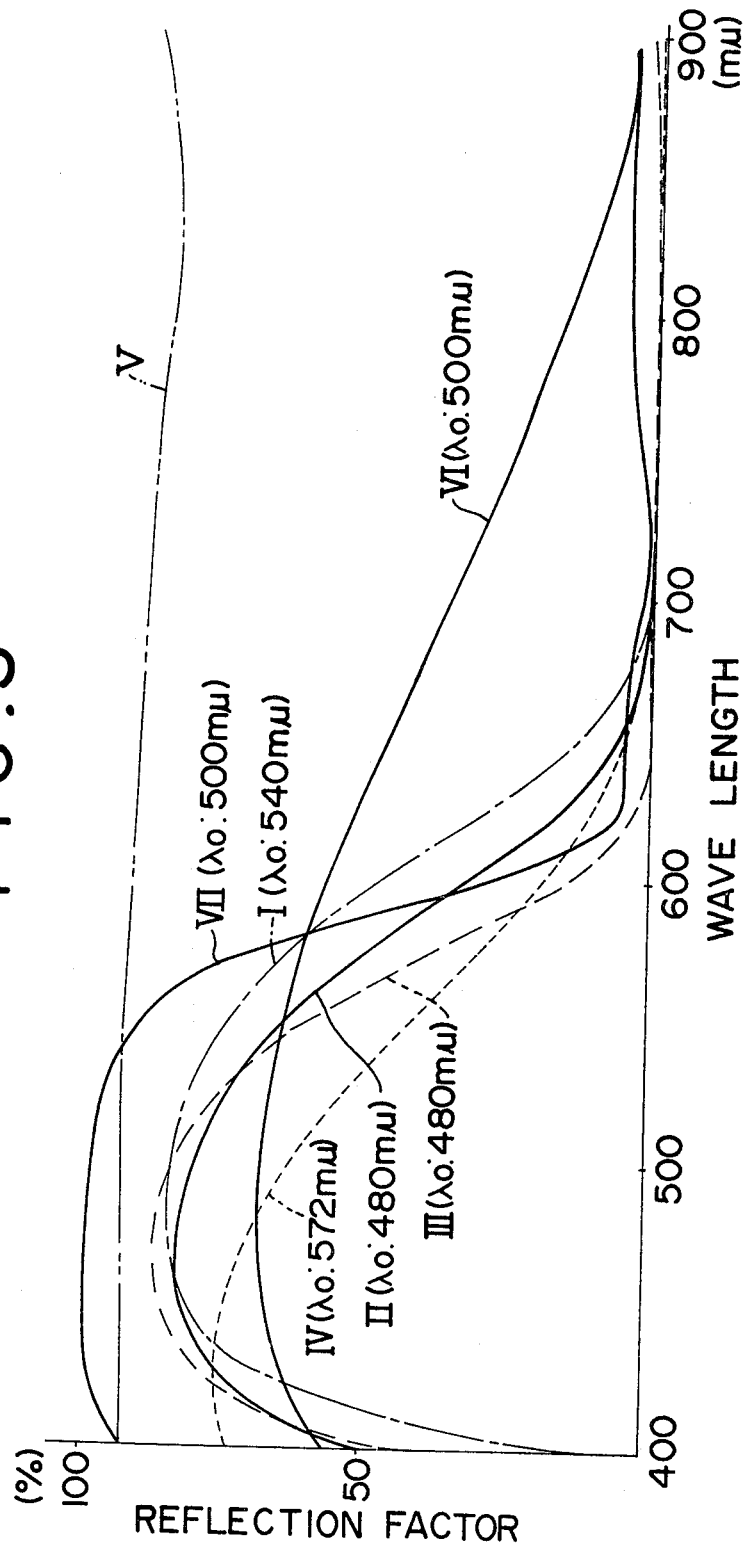

OPTICAL SYSTEM FOR COPIER

BACKGROUND OF THE INVENTION

1. Field of the Invention

The present invention relates to an optical system for use in a copier utilizing a combination of a halogen lamp and a CdS photosensitive member, said optical system comprising a multi-layered coating capable of matching the spectral characteristics of the light from an original with the spectral sensitivity of the photosensitive member.

2. Description of the Prior Art

In a conventional copier utilizing a reflective projection lens system, the mirror contained in said lens system is usually composed of a metal coated mirror for example of aluminum, which shows a uniformly high reflectivity from the near-ultraviolet to infrared wavelength region. Thus, in case of using a halogen lamp light source, having a light-emission energy distribution highest in the infrared region of 800 to 900 m$\mu$ and gradually decreasing toward the shorter wavelength region at an ordinary filament temperature of approximately 3000° C., in combination with a CdS photosensitive member having highest spectral sensitivity in the infrared to near-infrared wavelength regions, there will frequently result an excessive exposure in the red wavelength region in comparison with the green or blue wavelength region due to the additive effect of the above-explained characteristics of the light source and photosensitive member, leading to the defect that a red image, such as a red stamp, is reproduced unsatisfactorily or not at all on the copy.

In order to avoid such unmatching between the spectral characteristics of the incident light and the spectral sensitivity of the photosensitive member there is already known, as disclosed in the specification of German OLS No. 2350281, FIG. 6, a method of intercepting the light of unnecessary wavelength region by means of a filter placed in the imaging lens or in the vicinity thereof where the diameter of the light beam is smaller, but such method is unsatisfactory, as pointed out in said specification, in that a reflective lens system, different from a transmission lens system, will result in a significant loss of quantity of light as the imaging light bean passes the filter twice by entering into and emerging from the lens system and in that the imaging performance becomes inevitably deteriorated due to the reflections on the filter surfaces. Also in the IBM Technical Disclosure Bulletin, vol. 15, No. 2, July 1972, P. 522, there is disclosed a dichroic mirror for suppressing the light in the infrared and red wavelength regions. It is therefore expected to maintain desirable transmittance and imaging performance if the light of required wavelength region is reflected while that of unnecessary wavelength region is removed from transmission by providing the reflecting surface of the reflective lens system with a multi-layered interference coating of a property similar to that of the color separation dichroic mirror used in a color television camera, but the desired performance cannot be obtained when there is employed a multi-layered interference coating prepared by merely displacing the central wavelength of a conventional dichroic mirror. In order to obtain a reproduced image of an elevated quality, therefore, it is necessary to suitably suppress the exposure in the near-infrared wavelength region in response to the spectral characteristics and sensitivity of the combination of the halogen lamp and CdS photosensitive member while maintaining the exposures in the blue and green wavelength regions.

SUMMARY OF THE INVENTION

The object of the present invention is to provide a multi-layered interference coating adapted for use in a copier utilizing a halogen lamp as a light source and a CdS photosensitive member and containing a reflective lens system, said coating being capable of suppressing the exposure in the red wavelength region without decreasing the exposure in the blue and green wavelength regions.

The above-mentioned object is achieved by matching the spectral characteristics of the light reflected by an original with the spectral sensitivity of the photosensitive member by a multi-layered interference coating of a 5- to 9-layered structure composed of alternately superposed high-refractive and low-refractive layers and including 3 adjusting layers provided at the substrate side and air side for preventing reflection in the near-infrared wavelength region.

BRIEF DESCRIPTION OF THE DRAWINGS

FIG. 3 is a spectral reflectance chart of an example of interference coating.

DESCRIPTION OF THE PREFERRED EMBODIMENT

Figure 1:
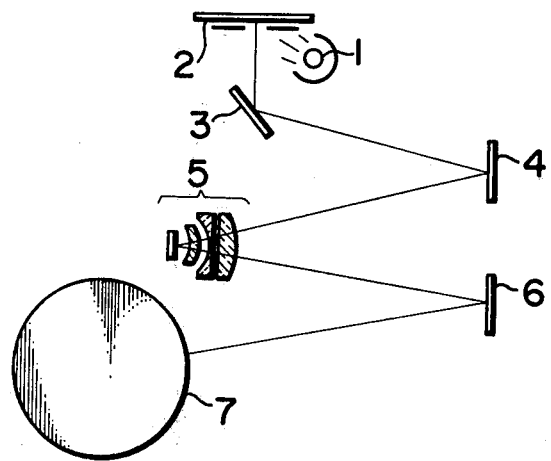
FIG. 1 is a cross-sectional view of the optical system embodying the present invention.

The present invention will be detailedly explained in the following, with reference to the attached drawings.

The present inventors have experimentally identified the spectral reflectance properties required for the multi-layered interference coating to be provided on a reflecting surface of a reflective projection lens system which is to be used in combination with a halogen lamp light source and a CdS photosensitive member. These requirements are as follows:

(1) A filter sharply cutting the unnecessary red wavelength region beyond 550 m$\mu$ results in a lowered contrast for blue, green and cyan colors though such filter enhances the contrast of red color. The filter should preferably have, therefore, a high reflectance in the blue and green short wavelength regions and a progressively lowering reflectance in the red wavelength region toward the near-infrared wavelength region where the filter should have no reflection:

(2) The filter should be provided with a high reflectance, at least 70% in average, in the blue and green wavelength regions from 400 to 550 m$\mu$: and (3) The filter should be anti-reflecting with an average reflectance not exceeding 1% in the near-infrared wavelength region beyond 700 m$\mu$.

The object of the present invention is to achieve a satisfactory contrast for all the colors by satisfying the above-mentioned requirements, particularly the first one, and said object is achieved, in an optical system for use in a copier, by a multi-layered interference coating provided on a reflecting surface in a reflective projection lens system, said coating being of a 5- to 9-layered structure composed of alternately superposed high-refractive and low-refractive layers and including therein three adjusting layers provided at the substrate side and air side for preventing reflection in the near-infrared wavelength region. The above-mentioned structure of 5 to 9 layers is reached in consideration of well-balanced red reproduction, as a structure with 4 or less layers will result in an excessively low reflectance while a structure with 10 or more layers will result in an excessively sharp cut-off property, leading to a low density reproduction of blue image.

In the following examples the low-refractive layer is composed of $MgF_2$ ($N=1.38$) while the high-refractive layer can be composed of various materials, and a structure of 5 to 7 layers is desirable in case the high-refractive layers are composed of a material with a refractive index of $N=2.15$ or higher such as $TiO_2$ or $CeO_2$, while a structure of 7 to 9 layers is adequate in case the high-refractive layers are composed of a material with a refractive index within a range 2.00 to 2.15 such as $ZrO_2$ or $Ta_2O_5$. The multi-layered coating shows a higher reflectance and can therefore be composed of fewer layers in case the ratio of the refractive index of the high-refractive layers to that of low-refractive layers becomes larger, while the coating shows a lower reflectance and requires therefore a larger number of layers to elevate the reflectance when said ratio is smaller.

Each layer should be provided with an optical thickness in principle equal to ¼ of a design wavelength $\lambda_0$ located in the approximate center of the desired high-reflectance wavelength region, and said design wavelength is to be selected according to the energy emission characteristics of the light source and the spectral sensitivity of the photosensitive member, and is usually determined within a range from 450 to 600 m$\mu$.

Besides two layers adjacent to the substrate and one layer adjacent to air, or one layer adjacent to the substrate and two layers adjacent to air have thicknessess modified from the above-mentioned basic thickness in order to prevent reflection in the near-infrared wavelength region. Though it is already known, in the conventional multi-layered dichroic mirror, to modify the thickness of one layer adjacent to the substrate and one layer adjacent to air in order to prevent so-called ripple or minute variation in the spectral characteristics, the thickness modification is further applied to one layer at the substrate side or at the air side according to the present invention in order to enhance anti-reflection in the near-infrared wavelength region.

Supposing that the total number of layers is equal to n and that the thickness of the i-th layer counted from the substrate side is represented by $ND_i$ ($i=1, 2, \ldots, n$), the thickness relationship of the layers in case two layers at the substrate side and one layer at the air side are utilized as the ripple-preventing adjusting layers can be represented as follows:

$$ND_n < ND_1 < ND_2 < ND_3 = ND_4 = \ldots = ND_{n-1}$$

while said relationship in case one layer at the substrate side and two layers at the air side are utilized as said adjusting layers can be represented as follows:

$$ND_n < ND_1 < ND_2 = ND_3 = \ldots = ND_{n-2} < ND_{n-1}.$$

Figure 2:
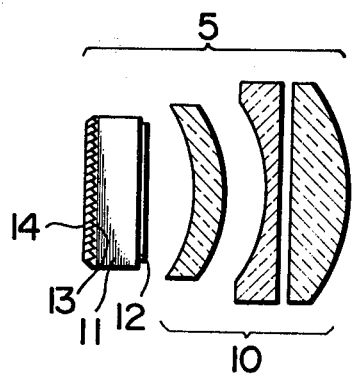
FIG. 2 is a partial cross-sectional view thereof.

In FIG. 1 illustrating an optical system for a copier embodying the present invention in a schematic cross-sectional view and FIG. 2 illustrating a reflective projection lens system in said optical system in an enlarged cross-sectional view, there are shown a light source lamp 1 such as a halogen lamp, an original 2, mirrors 3, 4 and 6 for deflecting the direction of the light path, a reflective projection lens system 5, a drum 7 provided thereon with a photosensitive layer, a lens group 10, a glass substrate 11, a multi-layered dielectric interference coating 12, a matted surface 13 provided on the rear surface of said substrate, and a light-absorbing anti-reflective paint layer 14 provided on said matted surface.

The light beam emitted from the light source 1 and reflected by the original 2 is guided by the mirrors 3 and 4, and enters the reflective projection lens system 5. The converging light beam passing through the lens group 10 is directed to the multi-layered interference coating 12 where it is subjected to a filtering effect according to the characteristics of said coating, whereby the useful light component is reflected by said coating while the unnecessary light component is transmitted by said coating into the substrate 11 and scattered or absorbed by the paint coating 14. The light beam reflected by said interference coating is further focused by said lens 10 and reflected by the mirror 6 to form an image of an original on the photosensitive drum 7.

In the following there are shown examples of the structure of the multi-layered interference coating, wherein Ns is a substrate, Nh a high-refractive layer, Nl a low-refractive layer and No air, and the layer thickness is represented by $ND/\lambda_0$:

EXAMPLE 1

|  |  |  | Refr. index | Thickness |
|---|---|---|---|---|
| Substrate |  | Ns | 1.52 |  |
| Layer | 1 | Nh | 2.13 | 0.150 |
|  | 2 | Nl | 1.38 | 0.202 |
|  | 3 | Nh | 2.13 | 0.250 |
|  | 4 | Nl | 1.38 | 0.250 |
|  | 5 | Nh | 2.13 | 0.250 |
|  | 6 | Nl | 1.38 | 0.250 |
|  | 7 | Nh | 2.13 | 0.126 |
| Air |  | No | 1.00 |  |

EXAMPLE 2

|  |  |  | Refr. index | Thickness |
|---|---|---|---|---|
| Substrate |  | Ns | 1.52 |  |
| Layer | 1 | Nh | 2.15 | 0.125 |
|  | 2 | Nl | 1.38 | 0.250 |
|  | 3 | Nh | 2.15 | 0.250 |
|  | 4 | Nl | 1.38 | 0.250 |
|  | 5 | Nh | 2.15 | 0.250 |
|  | 6 | Nl | 1.38 | 0.360 |
|  | 7 | Nh | 2.15 | 0.100 |
| Air |  | No | 1.00 |  |

EXAMPLE 3

|  |  |  | Refr. index | Thickness |
|---|---|---|---|---|
| Substrate |  | Ns | 1.52 |  |
| Layer | 1 | Nh | 2.05 | 0.104 |
|  | 2 | Nl | 1.38 | 0.250 |
|  | 3 | Nh | 2.05 | 0.250 |
|  | 4 | Nl | 1.38 | 0.250 |
|  | 5 | Nh | 2.05 | 0.250 |
|  | 6 | Nl | 1.38 | 0.250 |
|  | 7 | Nh | 2.05 | 0.250 |
|  | 8 | Nl | 1.38 | 0.357 |
|  | 9 | Nh | 2.05 | 0.079 |
| Air |  | No. | 1.00 |  |

EXAMPLE 4

|  |  | Refr. index | Thickness |
| --- | --- | --- | --- |
| Substrate |  | Ns | 1.52 |  |
| Layer | 1 | Nh | 2.35 | 0.134 |
|  | 2 | Nl | 1.38 | 0.145 |
|  | 3 | Nh | 2.35 | 0.250 |
|  | 4 | Nl | 1.38 | 0.250 |
|  | 5 | Nh | 2.35 | 0.083 |
| Air |  | No | 1.00 |  |

FIG. 3 shows the spectral reflectance along the ordinate as a function of wavelength along the abscissa, wherein the curves I, II, III and IV respectively correspond to the foregoing example 1, 2, 3 and 4, while the curve V shows the spectral reflectance of a conventional aluminum mirror, and the curves VI and VII respectively show those of a 3-layered coating without adjusting layers and an 11-layered coating without adjusting layers of the following structures:

VI

|  |  | Refr. index | Thickness |
| --- | --- | --- | --- |
| Substrate |  | Ns | 1.52 |  |
| Layer | 1 | Nh | 2.35 | 0.250 |
|  | 2 | Nl | 1.38 | 0.250 |
|  | 3 | Nh | 2.35 | 0.250 |
| Air |  | No | 1.00 |  |

VII

|  |  | Refr. index | Thickness |
| --- | --- | --- | --- |
| Substrate |  | Ns | 1.52 |  |
| Layer | 1 | Nh | 2.35 | 0.125 |
|  | 2 | Nl | 1.38 | 0.250 |
|  | 3 | Nh | 2.35 | 0.250 |
|  | 4 | Nl | 1.38 | 0.250 |
|  | 5 | Nh | 2.35 | 0.250 |
|  | 6 | Nl | 1.38 | 0.250 |
|  | 7 | Nh | 2.35 | 0.250 |
|  | 8 | Nl | 1.38 | 0.250 |
|  | 9 | Nh | 2.35 | 0.250 |
|  | 10 | Nl | 1.38 | 0.250 |
|  | 11 | Nh | 2.35 | 0.125 |
| Air |  | No | 1.00 |  |

As shown by the curves I, II, III and IV respectively corresponding to the foregoing examples, the multilayered interference coating of the present invention has a spectral reflectance gradually decreasing from the blue and green wavelength regions to the near-infrared region and substantially equal to zero in a wavelength region beyond 790 mμ. Also the comparison of the curves I and II with the curve III indicates a tendency of an increase in the inclination of the curve with the increasing number of layers, so that a structure composed in excess of 9 layers is undesirable because of excessively sharp cut-off property as shown by the curve VII. Furthermore, though a higher ratio of refractive indexes of high-refractive layer and low-refractive layer is effective for increasing the reflectance, a structure composed of less than 5 layers is unable to provide a satisfactory reflectance as shown by the curve VI even if said ratio is made satisfactorily high. The multi-layered interference coating of the present invention is preferably composed of an odd number of layers, as shown in the foregoing examples, since an additional layer for making an even number-layered structure will not improve the reflectance but merely complicate the procedure of preparation.

As detailedly explained in the foregoing, the present invention is advantageous in allowing copying of a red image as clearly as a black image due to the suppression of the red wavelength region and the elimination of near-infrared wavelength region, and further in assuring sufficient contrast for a blue or green image due to the gradually decreasing reflectance in the red wavelength region.

What we claim is:

1. An optical system for use in a copier comprising:
    a halogen lamp;
    a CdS photosensitive member; and
    a reflective projection lens system comprising a lens and a reflective surface, including a multi-layered interference coating formed on a substrate, provided behind said lens, said interference coating being a 5- to 9- layered structure composed of alternately superposed high refractive layers and low-refractive layers each of a basic optical thickness equal to ¼ of a design wavelength $\lambda_0$ and including therein two and one adjusting layers at the substrate side and the air side, respectively, of said coating to prevent reflection in the near-infrared wavelength region to thereby match the spectral characteristics of the light reflected from an original with the spectral sensitivity of said photosensitive member, wherein the optical thickness $ND_i$ of an i-th layer counted from the substrate side satisfies the following relation:

$ND_n < ND_1 < ND_2 < ND_3 = \ldots = ND_{n-1}$.

2. An optical system for use in a copier according to claim 1 wherein said multi-layered interference coating is a 5-, 7- or 9-layered structure starting with a high-refractive layer provided on the substrate.

3. An optical system for use in a copier according to claim 1 wherein said multi-layered interference coating has the following composition:

|  |  | Refractive index | Thickness ND/$\lambda_0$ |
| --- | --- | --- | --- |
| Substrate |  | 1.52 |  |
| Layer | 1 | 2.13 | 0.150 |
|  | 2 | 1.38 | 0.202 |
|  | 3 | 2.13 | 0.250 |
|  | 4 | 1.38 | 0.250 |
|  | 5 | 2.13 | 0.250 |
|  | 6 | 1.38 | 0.250 |
|  | 7 | 2.13 | 0.126 |
| Air |  | 1.00 |  |

4. An optical system for use in a copier according to claim 1 wherein said multi-layered interference coating has the following composition:

|  |  | Refractive index | Thickness ND/$\lambda_0$ |
| --- | --- | --- | --- |
| Substrate |  | 1.52 |  |
| Layer | 1 | 2.05 | 0.104 |
|  | 2 | 1.38 | 0.250 |
|  | 3 | 2.05 | 0.250 |
|  | 4 | 1.38 | 0.250 |
|  | 5 | 2.05 | 0.250 |
|  | 6 | 1.38 | 0.250 |
|  | 7 | 2.05 | 0.250 |
|  | 8 | 1.38 | 0.357 |
|  | 9 | 2.05 | 0.079 |

-continued

|  | Refractive index | Thickness ND/$\lambda_0$ |
|---|---|---|
| Air | 1.00 | |

5. An optical system for use in a copier according to claim 1 wherein said multi-layered interference coating following composition:

|  |  | Refractive index | Thickness ND/$\lambda_0$ |
|---|---|---|---|
| Substrate | | 1.52 | |
| Layer | 1 | 2.35 | 0.134 |
| | 2 | 1.38 | 0.145 |
| | 3 | 2.35 | 0.250 |
| | 4 | 1.38 | 0.250 |
| | 5 | 2.35 | 0.083 |
| Air | | 1.00 | |

6. An optical system for use in a copier according to claim 1, wherein said substrate is a glass substrate.

7. An optical system for use in a copier according to claim 6, wherein a matted surface is provided on a rear surface of said glass substrate and a light-absorbing anti-reflective layer is provided on said matted surface.

8. An optical system for use in a copier comprising:
a halogen lamp;
a CdS photosensitive member; and
a reflective projection lens system comprising a lens and a reflective surface, including a multi-layered interference coating formed on a substrate, provided behind said lens, said interference coating being a 5- to 9-layered structure composed of alternately superposed high-refractive layers and low-refractive layers each of a basic optical thickness equal to ¼ of a design wavelength $\lambda_0$ and including therein one and two adjusting layers at the substrate side and the air side of said coating, respectively, to prevent reflection in the near-infrared wave-length region to thereby match the spectral characteristics of the light reflected from an original with the spectral sensitivity of said photosensitive member, wherein the optical thickness $ND_i$ of an i-th layer counted from the substrate side satisfies the following relation:

$$ND_n < ND_1 < ND_2 \ldots = ND_{n-2} < ND_{n-1}.$$

9. An optical system for use in a copier according to claim 8 wherein said multi-layered interference coating has the following composition:

|  |  | Refractive index | Thickness ND/$\lambda_0$ |
|---|---|---|---|
| Substrate | | 1.52 | |
| Layer | 1 | 2.15 | 0.125 |
| | 2 | 1.38 | 0.250 |
| | 3 | 2.15 | 0.250 |
| | 4 | 1.38 | 0.250 |
| | 5 | 2.15 | 0.250 |
| | 6 | 1.38 | 0.360 |
| | 7 | 2.15 | 0.100 |
| Air | | 1.00 | |

10. An optical system for use in a copier according to claim 8 wherein said multi-layered interference coating is a 5-, 7- or 9- layered structure starting with a high-refractive layer provided on the substrate.

11. An optical system for use in a copier according to claim 8, wherein said substrate is a glass substrate.

12. An optical system for use in a copier according to claim 11, wherein a matted surface is provided on the rear surface of said glass substrate and a light-absorbing anti-reflective layer is provided on said matted surface.

* * * * *